(12) United States Patent
Thirunavukkarasu (10) Patent No.: US 11,790,430 B2
(45) Date of Patent: Oct. 17, 2023

(54) METHOD AND SYSTEM FOR DETERMINING UNIFIED USER INTENTION FROM DIGITAL ENVIRONMENT FOR PLURALITY OF STRATEGIES

(71) Applicant: Tata Consultancy Services Limited, Mumbai (IN)

(72) Inventor: Jeisobers Thirunavukkarasu, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 83 days.

(21) Appl. No.: 17/475,634

(22) Filed: Sep. 15, 2021

(65) Prior Publication Data

US 2022/0292570 A1   Sep. 15, 2022

(30) Foreign Application Priority Data

Mar. 15, 2021  (IN) .............................. 202121010971

(51) Int. Cl.
*G06Q 30/02* (2023.01)
*G06Q 30/0601* (2023.01)
(Continued)

(52) U.S. Cl.
CPC ..... *G06Q 30/0631* (2013.01); *G06Q 30/0201* (2013.01); *G06Q 30/0254* (2013.01); *G06Q 30/0241* (2013.01); *G06Q 30/0255* (2013.01)

(58) Field of Classification Search
CPC ........... G06Q 30/0631; G06Q 30/0201; G06Q 30/0254
See application file for complete search history.

(56) References Cited

U.S. PATENT DOCUMENTS 9,251,591 B2    2/2016  Song et al.
9,405,773 B2 *  8/2016  Chittar .................. G06F 16/532
(Continued)

FOREIGN PATENT DOCUMENTS

CA    2 813 948 A1    4/2011
CN    106504064 A     3/2017

OTHER PUBLICATIONS

"Defining Helpful Filter Categories and Values for Better UX" (Moran, Kate published on Jul. 15, 2018 at https://www.nngroup.com/articles/filter-categories-values/) (Year: 2018).*

*Primary Examiner* — James M Detweiler
(74) *Attorney, Agent, or Firm* — Finnegan, Henderson, Farabow, Garrett & Dunner LLP (57) ABSTRACT

Traditionally, strategies are carried out based on customer intention indicated from surveys, transactional data, location of the store and customer profile. They have limitations such as partial capture of customer intention, absence of transactional data, challenges in defining catchment area associated with store location and lack of customer profiles. This disclosure relates to determining unified user intention from digital environment for plurality of strategies. An information associated with user is received. The information associated with the user is processed to derive weights associated with the user. The weights are integrated and mined through a variable reduction technique to determine at least one significant latent variable from a plurality of significant latent variables and associated significant attribute values. A structural equation model (SEM) is developed by applying the significant latent variables and the at least one event and a plurality of strategies are recommended for the plurality of applications.

17 Claims, 5 Drawing Sheets

(51) Int. Cl.
  *G06Q 30/0251* (2023.01)
  *G06Q 30/0201* (2023.01)
  *G06Q 30/0241* (2023.01)

(56) References Cited

U.S. PATENT DOCUMENTS

| | | | |
|---|---|---|---|
| 10,002,337 B2 | 6/2018 | Siddique et al. | |
| 2010/0268661 A1* | 10/2010 | Levy | G06Q 30/02 |
| | | | 705/347 |
| 2013/0215116 A1 | 8/2013 | Siddique et al. | |
| 2015/0120732 A1* | 4/2015 | Nemery De Bellevaux | |
| | | | G06F 16/285 |
| | | | 707/737 |
| 2017/0053208 A1* | 2/2017 | Krishnamurthy | G06N 5/022 |
| 2017/0344620 A1* | 11/2017 | Modarresi | G06F 18/00 |
| 2019/0087529 A1 | 3/2019 | Steingrimsson et al. | |

* cited by examiner

METHOD AND SYSTEM FOR DETERMINING UNIFIED USER INTENTION FROM DIGITAL ENVIRONMENT FOR PLURALITY OF STRATEGIES

PRIORITY CLAIM

This U.S. patent application claims priority under 35 U.S.C. § 119 to: India Application No. 202121010971, filed on 15 Mar. 2021. The entire contents of the aforementioned application are incorporated herein by reference.

TECHNICAL FIELD

This disclosure relates generally to recommendation system, and, more particularly, to system and method for determining unified user intention from a plurality of digital environments for plurality of strategies.

BACKGROUND

There is a major growth in recent years in retail due to digital transformation. In current scenario, a consumer intention is vital to understand and to succeed in a highly competitive business environment. Understanding what motivates the consumer intention is critical because such intention is a key to survival in this fast-paced and digitized business environment. Purchase intentions are frequently measured and used by one or more owners as an input for one or more decisions about new and existing products and services. Prior research has attempted at most conducting personal as well as online survey to arrive at customer intension based on their responses. Online surveys have some advantages over traditional paper-based surveys, including lower cost, rapid response and lack of geographical limitations and primary units of analysis in this study are individual consumers with experience in online shopping. As an incentive, prizes are offered to respondents who answered all the questions. The drawback of surveys is customer unwillingness to take survey incomplete information and reliability of results.

Traditionally major decisions in business are made based on one or more kind of users associated with the business as an indirect measure of the customer intention. Type of users are indicated by the profiles of customers and the customers are hesitant to provide personal details. Often, the customer profile information is incomplete and becomes challenging by using strategies based on the customer profile. Alternatively, store location as an indirect measure of the customer intention is used to form one or more practical strategies. The location-based practical strategies depend on demography's of the store and are decided by population residing in a trade area or a catchment area. Fixing of catchment area at category level or business level is challenging.

Traditionally major decisions in business are made based on the customer intention indicated from transactional data stored in various system such as point of sales system of retailers, storage system related with car sales by automobile manufacturer, storage system related with food ordered, in online food ordering and delivery platform or storage system related with rooms booked in hotels, etc. They are the results of products or services offered by the business. They have limitation that they may not capture the products, nor capturing the services intended by the customers.

SUMMARY

Embodiments of the present disclosure present technological improvements as solutions to one or more of the above-mentioned technical problems recognized by the inventors in conventional systems. For example, in one aspect, a processor implemented method of determining unified user intention from a plurality of digital environments for plurality of strategies is provided. The processor implemented method includes at least one of: receiving, via one or more hardware processors, an information associated with a plurality of users accessing the plurality of digital environments; processing, via the one or more hardware processors, the information associated with the plurality of users to derive at least one weight associated with the at least one user; integrating, via the one or more hardware processors, the at least one weight and a plurality of weights associated with a plurality of applications by an user identifier to obtain integrated plurality of weights; mining, via the one or more hardware processors, the integrated plurality of weights through a variable reduction technique to determine at least one significant latent variable from a plurality of significant latent variables and associated significant attribute values; developing, via the one or more hardware processors, at least one structural equation model (SEM) by applying the significant latent variables and at least one event from the plurality of events; and recommending, via the one or more hardware processors, a plurality of strategies for the plurality of applications based on the at least one structural equation model. The information associated with the plurality of users accessing the plurality of digital environments corresponds to at least one of: (a) order of a filter, (b) a plurality of click patterns, (c) a plurality of events, and (d) combination thereof. The plurality of strategies corresponds to at least one of: (a) a customized promotion, (b) an assortment, (c) a manufacturing process, and (d) an advertisement.

In an embodiment, the plurality of applications corresponds to at least one of (a) a product, (b) a service, and (c) a category. In an embodiment, the plurality of events corresponds to at least one of: (a) time spent by the at least one user while accessing the plurality of digital environments for an intended product, (b) number of click patterns by the at least one user, (c) the intended product purchased by the at least one user, and (d) combination thereof. In an embodiment, the at least one weight is derived while the plurality of users accessing the plurality of digital environments based on at least one of: (a) the number of click patterns, and (b) the order of click or filter. In an embodiment, the significance of the latent variable is identified from at least one eigen value. In an embodiment, the significance of attribute value is identified from a significant factor loadings under each significant latent variable. In an embodiment, a user's intention proportion of attribute values is predicted for the plurality of strategies in a real time. In an embodiment, an event is regressed against at least one latent variable of the plurality of applications to form a structural equation model_event to identify a significance of a latent variable. In an embodiment, the significant latent variables are named based on a significance and a magnitude of attribute values within a latent variable and to identify synergistic intentions of the plurality of users associated with the attribute values. In an embodiment, at least one latent variables of a new category or a product are regressed against the latent variable of an existing category or a product to form a structural equation model_latent for recommending the plurality of strategies in a real time which is independent of a transactional history and a profile information. In an embodiment, the plurality of strategies through intention service comparison is performed by comparing a proportion of intention against a proportion of attribute values of the existing service for identifying at least one gap in the existing service and to take the plurality of strategies in the absence of the transactional history. In an embodiment, the plurality of strategies are recommended based on at least one of: (a) predicted latent variable for the plurality of applications from the structural equation model_latent. (b) inferring significance of latent variables for the plurality of applications from the structural equation model_event, and (c) an intention service comparison.

In another aspect, there is provided a user intention derivation system to determine unified user intention from a plurality of digital environments for a plurality of strategies. The user intention derivation system comprises a memory storing instructions; one or more communication interfaces; and one or more hardware processors coupled to the memory via the one or more communication interfaces, wherein the one or more hardware processors are configured by the instructions to: receive, an information associated with a plurality of users accessing the plurality of digital environments; process, the information associated with the plurality of users to derive at least one weight associated with the at least one user; integrate, the at least one weight and a plurality of weight associated with a plurality of applications by an user identifier to obtain integrated plurality of weights; mine, the integrated plurality of weights through a variable reduction technique to determine at least one significant latent variable from a plurality of significant latent variables and associated significant attribute values; develop, at least one structural equation model (SEM) by applying the significant latent variables and at least one event from the plurality of events; and recommend, a plurality of strategies for the plurality of applications based on the at least one structural equation model. The information associated with the plurality of users accessing the plurality of digital environments corresponds to at least one of: (a) order of a filter, (b) a plurality of click patterns, (c) a plurality of events, and (d) combination thereof. The plurality of strategies corresponds to at least one of: (a) a customized promotion, (b) an assortment, (c) a manufacturing process, and (d) an advertisement.

In an embodiment, the plurality of applications corresponds to at least one of (a) a product, (b) a service, and (c) a category. In an embodiment, the plurality of events corresponds to at least one of: (a) time spent by the at least one user while accessing the plurality of digital environments for an intended product, (b) number of click patterns by the at least one user, (c) the intended product purchased by the at least one user, and (d) combination thereof. In an embodiment, the at least one weight is derived while the plurality of users accessing the plurality of digital environments based on at least one of: (a) the number of click patterns, and (b) the order of click or filter. In an embodiment, the significance of the latent variable is identified from at least one eigen value. In an embodiment, the significance of attribute value is identified from a significant factor loadings under each significant latent variable. In an embodiment, a user's intention proportion of attribute values is predicted for the plurality of strategies in a real time. In an embodiment, an event is regressed against at least one latent variable of the plurality of applications to form a structural equation model_event to identify a significance of a latent variable. In an embodiment, the significant latent variables are named based on a significance and a magnitude of attribute values within a latent variable and to identify synergistic intentions of the plurality of users associated with the attribute values. In an embodiment, at least one latent variables of a new category or a product are regressed against the latent variable of an existing category or a product to form a structural equation model_latent for recommending the plurality of strategies in a real time which is independent of a transactional history and a profile information. In an embodiment, the plurality of strategies through intention service comparison is performed by comparing a proportion of intention against a proportion of attribute values of the existing service for identifying at least one gap in the existing services and to take the plurality of strategies in the absence of the transactional history. In an embodiment, the plurality of strategies are recommended based on at least one of: (a) predicted latent variable for the plurality of applications from the structural equation model_latent, (b) inferring significance of latent variables for the plurality of applications from the structural equation model_event, and (c) an intention service comparison.

In yet another aspect, there are provided one or more non-transitory machine readable information storage mediums comprising one or more instructions which when executed by one or more hardware processors causes at least one of receiving, an information associated with a plurality of users accessing the plurality of digital environments; processing, the information associated with the plurality of users to derive at least one weight associated with the at least one user; integrating, the at least one weight and a plurality of weights associated with a plurality of applications by an user identifier to obtain integrated plurality of weights; mining, the integrated plurality of weights through a variable reduction technique to determine at least one significant latent variable from a plurality of significant latent variables and associated significant attribute values; developing, at least one structural equation model (SEM) by applying the significant latent variables and the at least one event from the plurality of events; and recommending, a plurality of strategies for the plurality of applications based on the at least one structural equation model. The information associated with the plurality of users accessing the plurality of digital environments corresponds to at least one of: (a) order of a filter, (b) a plurality of click patterns, (c) a plurality of events, and (d) combination thereof. The plurality of strategies corresponds to at least one of: (a) a customized promotion, (b) an assortment, (c) a manufacturing process, and (d) an advertisement.

In an embodiment, the plurality of applications corresponds to at least one of (a) a product, (b) a service, and (c) a category. In an embodiment, the plurality of events corresponds to at least one of: (a) time spent by the at least one user while accessing the digital environment for an intended product, (b) number of click patterns by the at least one user. (c) the intended product purchased by the at least one user, and (d) combination thereof. In an embodiment, the at least one weight is derived while the plurality of users accessing the plurality of digital environments based on at least one of: (a) the number of click patterns, and (b) the order of click or filter. In an embodiment, the significance of the latent variable is identified from at least one eigen value. In an embodiment, the significance of attribute value is identified from a significant factor loadings under each significant latent variable. In an embodiment, a user's intention proportion of attribute values is predicted for the plurality of strategies in a real time. In an embodiment, an event is regressed against at least one latent variable of the plurality of applications to form a structural equation model_event to identify a significance of a latent variable. In an embodiment, the significant latent variables are named based on a significance and a magnitude of attribute values within a latent variable and to identify synergistic intentions of the plurality of users associated with the attribute values. In an embodiment, at least one latent variables of a new category or a product are regressed against the latent variable of an existing category or a product to form a structural equation model_latent for recommending the plurality of strategies in a real time which is independent of a transactional history and a profile information. In an embodiment, the plurality of strategies through intention service comparison is performed by comparing a proportion of intention against a proportion of attribute values of the existing service for identifying at least one gap in the existing services and to take the plurality of strategies in the absence of the transactional history. In an embodiment, the plurality of strategies are recommended based on at least one of: (a) predicted latent variable for the plurality of applications from the structural equation model_latent, (b) inferring significance of latent variables for the plurality of applications from the structural equation model_event, and (c) an intention service comparison.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments of the present disclosure provide a method and system for determining unified user intention using digital sources for plurality of strategies and offering customer intention-based solution for different practical requirements. The embodiments of the present disclosure provides an approach for derivation of intention of one or more users or an unified intention of the one or more users within an application or across applications (e.g., at least one business, a service, a category etc.) to enable practical solutions such as recommending at least one of (a) one or more products, one or more services to be retained or to be removed in an existing business, in stores, in a category having a transaction history; (b) products or services to be retained, offered in a new or existing business, store, category having no transaction history; (c) default real time filter in an online portal, kiosk for existing customers and new customers with no profile information; and (d) targeted promotion in real time for existing customers and new customers with no profile information.

Referring now to the drawings, and more particularly to FIGS. 1 through 4B, where similar reference characters denote corresponding features consistently throughout the figures, there are shown preferred embodiments and these embodiments are described in the context of the following exemplary system and/or method.

Figure 1:
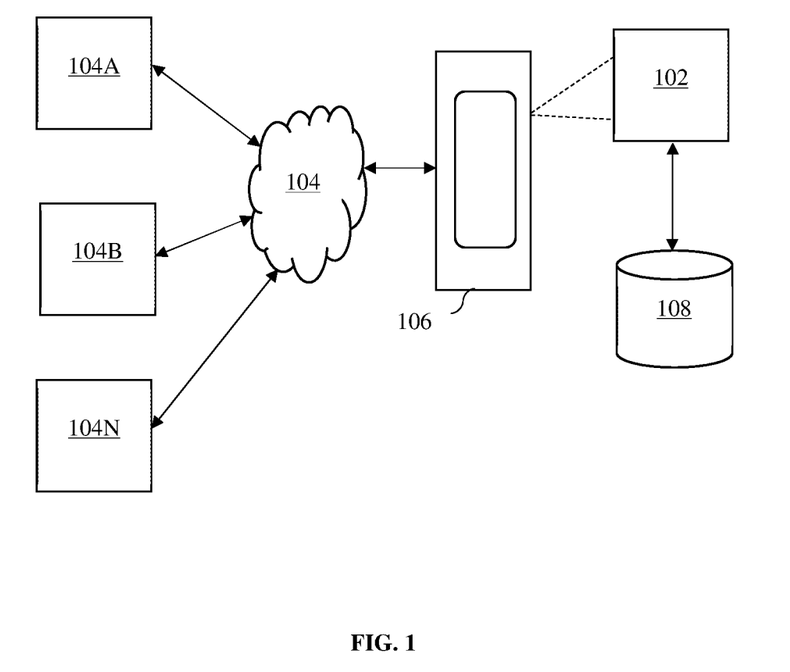
FIG. 1 illustrates a network implementation of a system for determining unified user intention from a plurality of digital environments for plurality of strategies, according to an embodiment of the present disclosure.

FIG. 1 illustrates a network implementation 100 of a system 102 for determination of unified user intention from a plurality of digital environments for plurality of strategies, according to an embodiment of the present disclosure. The system is adapted to determine the unified user intention from the digital sources for the plurality of strategies. Although the present subject matter is explained considering that the system 102 is implemented for determining the unified user intention from the digital sources for the plurality of strategies and may be understood that the system 102 may not be restricted to any particular machine or environment. In an embodiment, the system 102 are implemented in a variety of computing systems, such as laptop computers, notebooks, hand-held devices, workstations, mainframe computers, servers, a network cloud, a smart phone, a wearable device, and the like.

Herein, the system 102 may acquire an input data for determining the unified user intention from the digital sources to the user via one or more user devices 104-A, 104-B . . . 104-N, collectively referred to as devices 104 hereinafter. In an embodiment, the user devices 104 may be embodied in handheld electronic device, a mobile phone, a smartphone, a portable computer, a PDA, and so on. The user devices 104 are communicatively coupled to the system 102 through a network 104 and may be capable of providing input data to the system 102.

In one implementation, the network 104 may be a wireless network, a wired network or a combination thereof. The network 104 can be implemented as one of the different types of networks, such as intranet, local area network (LAN), wide area network (WAN), the internet, and the like. The network 104 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 104 may include a variety of network devices, including routers, bridges, servers, computing devices, storage devices, and the like.

Figure 2:
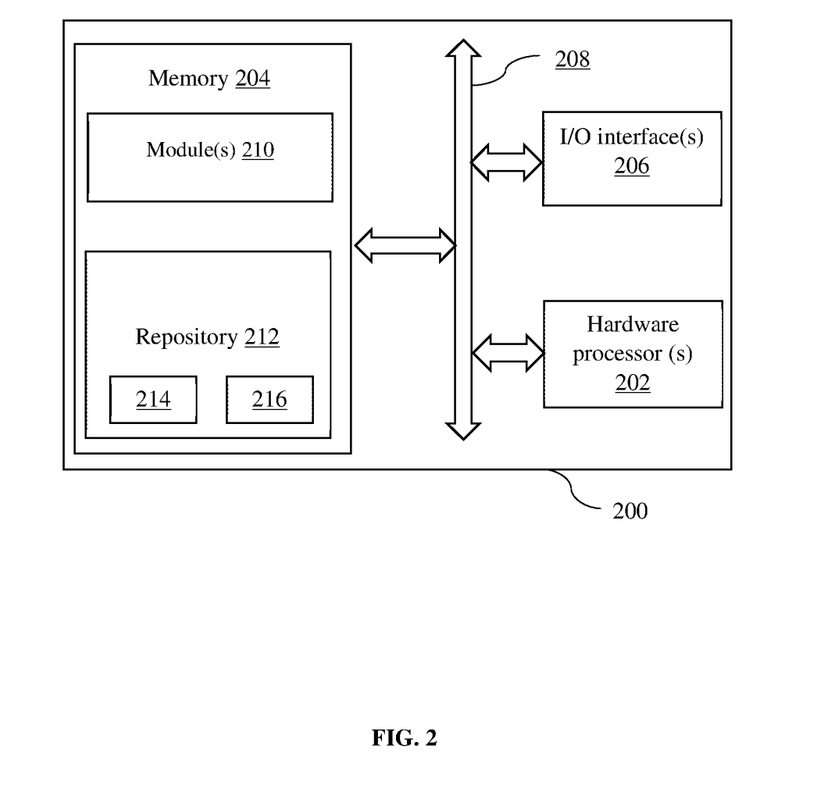
FIG. 2 illustrates a block diagram of a system for determining unified user intention from the plurality of digital environments for the plurality of strategies, according to an embodiment of the present disclosure.

In an embodiment, the system 102 may be embodied in the computing device 106. The system 102 may also be associated with a data repository 108 to store at least data required to estimate one or more perceptions associated with the user. Additionally, or alternatively, the data repository 108 may be configured to store data and/or information generated during determination of the unified user intention from the digital sources. The data repository 108 may be configured outside and communicably coupled to the computing device 106 embodying the system 102. Alternatively, the data repository 108 may be configured within the system 102. An example implementation of the system 102 for assorting the apparel specific to the user in the plurality of digital environments based on calculated perception associated with the user by the machine learning techniques described further with reference to FIG. 2B. In an embodiment, the machine learning techniques corresponds to a structure equation modelling.

Figure 3:
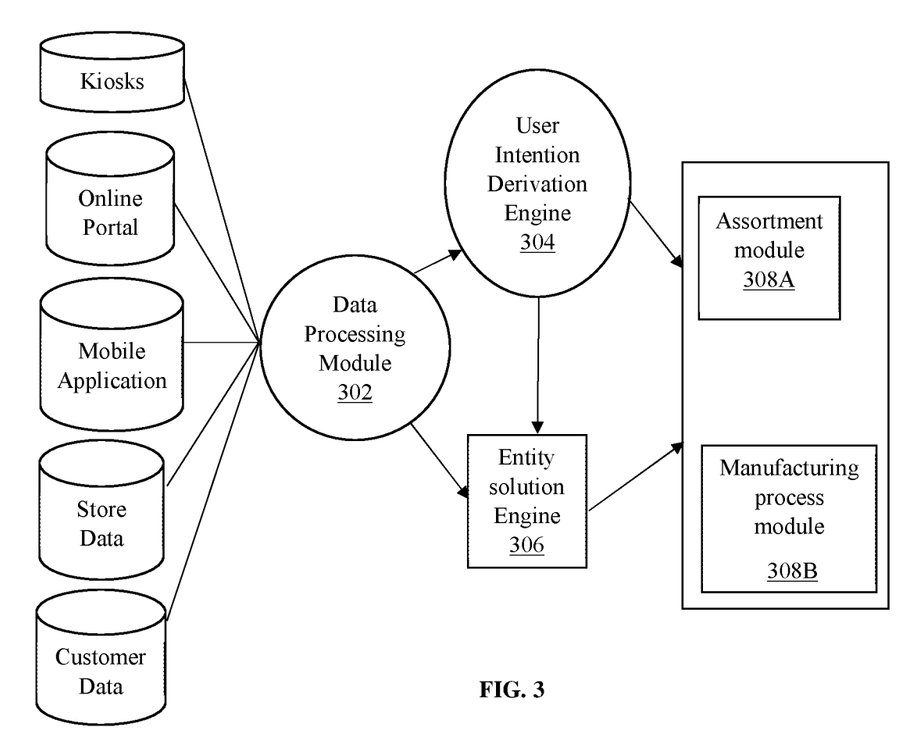
FIG. 3 illustrates an exemplary block diagram of the system, interchangeably referred herein as a user intention derivation system for determination of the unified user intention from the plurality of digital environments for the plurality of strategies, according to an embodiment of the present disclosure.

FIG. 2 illustrates a block diagram of a system 200 for determination of the unified user intention from the plurality of digital environments for the plurality of strategies, according to an embodiment of the present disclosure. The system 200, is interchangeably referred herein as a user intention derivation system 200 or a user intention derivation system 300 (as depicted in FIG. 3). The system 200 may be an example of the system 102 (FIG. 1). In an example embodiment, the system 200 may be embodied in, or is in direct communication with the system, for example the system 102 (FIG. 1). In an embodiment, the system 200 includes one or more processors 202, communication interface device(s) or input/output (I/O) interface(s) 206, and one or more data storage devices or memory 204 operatively coupled to the one or more processors 202. The memory 204 comprises a database. The processor 202, memory 204, and the I/O interface 206 may be coupled by a system bus such as a system bus 208 or a similar mechanism. The one or more processors 204 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory 204.

The I/O interface device(s) 206 can include a variety of software and hardware interfaces, for example, a web interface, a graphical user interface, and the like. The interfaces 206 may include a variety of software and hardware interfaces, for example, interfaces for peripheral device(s), such as a keyboard, a mouse, an external memory, a camera device, and a printer. Further, the interfaces 206 may enable the system 102 to communicate with other devices, such as web servers and external databases. The interfaces 208 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) can include one or more ports for connecting number of devices to one another or to another server.

The memory 204 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 204 includes a plurality of modules 210 and a repository 212 for storing data processed, received, and generated by the plurality of modules 210. The plurality of modules 210 may include routines, programs, objects, components, data structures, and so on, which perform particular task or implement particular abstract data types.

Further, the database stores information pertaining to inputs fed to the system and/or outputs generated by the system (e.g., data/output generated at each stage of the data processing), specific to the methodology described herein. More specifically, the database stores information being processed at each step of the proposed methodology.

Additionally, the other modules 210 may include programs or coded instructions that supplement applications and functions of the system 200. The repository 212, amongst other things, includes a system database 214 and other data 216. The other data 216 may include data generated as a result of the execution of one or more modules in the module (s) 210. Herein, the memory for example the memory 204 and the computer program code configured to, with the hardware processor for example the processor 202, causes the system 200 to perform various functions described herein under. The system database 214 store information associated with one or more users and one or more applications which include plurality of associated parameters.

FIG. 3 illustrates an exemplary block diagram of the system 200, interchangeably referred herein as the user intention derivation system 300 for determination of the unified user intention from the plurality of digital environments for the plurality of strategies, according to an embodiment of the present disclosure. In an embodiment, the plurality of digital environment corresponds to (a) an online portal, kiosk, a mobile application, a database with a store data, and a database with a customer data. The user intention derivation system 300 is configured to receive information associated with order of filtering or clicking of icons by at least one user during finding an intended product or one or more services at one or more digital sources. In an embodiment, the one or more digital sources corresponds to an online portal, a kiosk, one or more similar applications of business or categories. For example, the user may shortlist an apparel under 'men's top' category, in an instance he/she may try to shortlist a hotel room using the online portal and in another instance he/she may try to shortlist a rental car service using the kiosk. The selection under 'men's top' category, hotel service, and rental car service are few examples for one or more applications.

The information associated with the filter, or the information associated with click while searching for an intended product or service through the one or more digital sources is collected. In one embodiment, the information associated with the filter for at least one business or category is collected to process further to derive the at least one user intention. In another embodiment, the information associated with the filter, or the click is collected from group of business or categories or one or more businesses to derive the unified user intention. In one embodiment, the information associated with the filter for one application is collected to process further to derive a user intention. In another embodiment, the information associated with the filter is collected from group of applications to derive unified user intention. The unified intention denotes the integrated intention that is a result of at least one intention associated with one or more businesses. In an embodiment, an intention associated with at least one business may be related with an intention associated with other business or may be influenced by an intention associated with other business.

The information associated with the filter, or the information associated with click are integrated with a user identifier (a user ID). In one embodiment, the one or more users are identified based on a mobile number or login details of the online portal (e.g., e-commerce portal), or the mobile application. In another embodiment, the one or more users are identified by the kiosks which may have built-in features such as a facial recognition, a thumb impression, etc. In an embodiment, the one or more users with no profile information or with an incomplete information are also included using the user ID for derivation of the unified user intention based on their activities and not dependent on the associated profile. In an embodiment, users may search and review products in e-commerce portal and purchase the product in a store and they are identified using user id in an omnichannel environment.

The information associated with the filter is collected from one or more customer segments. In an instance, the filter information associated to a user segment representing such as young, high income, information technology (IT) profession, and ethnicity 'A' are collected. In another instance, the information is collected from old, retired, medium income and ethnicity 'B' and are used to derive the user intention associated with the user segments. In one embodiment, the information associated with the filter is collected from one or more store segments, and one or more prize zone level. A time duration is decided for collected information associated with the filter based on trend associated with at least one application. For example, (a) duration of collected information is from recent six months for fashion apparels, (b) duration of collected information is from last one year for one or more mobile categories, (c) duration of collected information is from last two years for a car rental service, and (d) duration of collected information is from last five years for a hotel booking.

The information associated with the filter and the information associated with the click for the one or more users are processed to derive and assign weights which is based on number of clicks and an order of click or filter by the one or more users during finding an intended product or the service through the online portal or the kiosk. The one or more filter or the click pattern of one or more users in the kiosk or in the similar applications to shortlist few items initially followed by a detailed review of the one or more items before selecting a product.

In an embodiment, while applying the filter by the user during selection of the product or the service or a need, order of attributes that are clicked is taken into consideration for deriving one or more weights to enable at least one differentiation of (a) attribute values, (b) a product character, (c) a service character intended by customers. In an embodiment, weighing process is carried at each business individually. For example, for few attribute values associated with apparel are polka dot pattern, off-shoulder pattern, round neck, turtle neck, long sleeve, black color, bell sleeve, flared sleeve, cotton fabric and rayon fabric. In one embodiment, if there are n filters and m filters are applied then, initial filter may be assigned with a weight of 'n' and next filter is assigned with n−1(n/m), and other filters in order of click is assigned with n−2 (n/m), n−3 (n/m) and so on. The filters which are not applied are assigned with zero values. In an embodiment, the user with fewer clicks may get more weights as compared with customers with more clicks. In one embodiment, if there are twenty filters, and two filters are applied then a first filter applied may be assigned with a weight of twenty and a second filter applied may be assigned with a weight of ten. In same way, among the twenty filters, if five filters are applied, then the first filter may be assigned with twenty, and next 4 filters may be assigned with 16, 12, 8 and 4 to the filters in order of clicking.

For example, a user may try to shortlist an apparel under 'women's top' category having twenty filters or options using a kiosk, by clicking in order of long sleeve, white color, brand 'A', a synthetic material and with price range 'm', and the five filters may be assigned with weights of 20, 16, 12, 8 and 4 in order. In exemplary embodiment, he/she may try to shortlist a health spa service having seven filters using online portal by selecting options a, b, c in order and three filters may be assigned with weights 7, 4.7 and 2.4 in order. As total number of filters indicate options available for the users and first filter indicates the user preference or the attribute having higher priority as compared to last filter indicating lesser importance to the user. Those filters which are not applied have least preference for the user. Hence, the weighted filter information is created to enable better differentiation of attribute values, the product character, the service character intended by the one or more users.

The information associated with the filter, the click patterns from one or more online portals, kiosks, similar applications of the one or more business or categories is integrated by using the user ID. A user intention derivation engine 304 is configured to process the weighed integrated filter information associated with the one or more users for at least one business or one or more businesses through a variable reduction technique to determine at least one significant latent variables from a plurality of significant latent variables. A significance of the at least one latent variable is identified from one or more eigen values. Similarly, a significance of an attribute value is identified from a significant factor loadings under each significant latent variable. In an embodiment, the variable reduction technique corresponds to but not limited to a principal component analysis. The principal component analysis provides the significant latent variables, associated significant attribute values, the eigen values and the factor loadings. In an embodiment, the significant attribute values are combined to indicate a latent variable. Each latent variable includes a set of attribute values which are significant.

In an exemplary embodiment, the principal component analysis is applied using the weighted filter information of a business or category individually to derive the customer intention associated with a single business or a category. In an embodiment, the category corresponds to a group of products that are having similar buying preferences or having attribute values that are alternative to each other. For example, for category are women's tops, women's suits, men's shirts, and men's suits, etc. The weighed filter information associated with a single business namely 'women's formal dresses' category or a mobile category or a hotel booking or a food order or a car rental is applied with the principal component analysis but not limited to similar variable reduction techniques to derive user's intention.

The user intention is derived in four methods such as (a) from the order of attribute values present in the significant latent variable, (b) from a magnitude of factor loadings of the attribute values in the significant factor loadings, (c) from group of attribute values that exist in one latent variable which differ from another group of attribute values that exist in another latent variable, and (d) from a non-significant attribute values. The outcome of the four methods may be applied for one or more strategies. In one embodiment, the one or more strategies corresponds to online assortment, online car portal, online hotel booking, online food ordering, etc.

In a first exemplary embodiment, the user intention reflected by the order of the attribute values for choosing a product or service of a business. The important attribute values for the one or more users among the large number of attribute values provided as at least one option for the one or more users in the online portal or the kiosk are identified from the order of significant attribute values of a significant latent variable received from the principal component analysis. The selection which are based on cause or purpose, or an intended behavior are identified from significance. Similarly, the attribute values that are selected based on random or unintended purpose are identified from a non-significance of outputs received from principal component analysis. The identified attribute values and associated order may be applied for one or more strategies.

In one embodiment, the user intention derivation engine 304 is interconnected with a manufacturing process module 308B that decides manufacturing of apparels for current season. For example, women's formal dress, for which outcomes received from the user intention derivation engine 304 is interconnected with the manufacturing process module 308B and the order of attribute value preference such as a black color, a polka dot pattern, and an eco-sunny brand is considered for manufacturing. The user intention derivation engine 304 identifies lost sales opportunity and identifies attributes to be added for a brick-and-mortar stores and e-commerce retailing. The manufacturing process module 308B may receive the information related with the gap in attributes, their weights from the user intention derivation engine 304 and may incorporate into one or more existing manufacturing listings for a group of stores and the e-commerce retailing.

In another embodiment, the order of importance during display of the product or service can be decided in the online portal i.e., order of personalized promotion. In an embodiment, the user intention derivation engine 304 is interconnected with an advertisement module (not shown in FIG) of a retailer to decide a design to be advertised for a current season. The user intention derivation engine 304 may interact with the advertising module by providing the attribute values or services with high user intention to consider for the advertisement In another embodiment, order may be used for modifying or rearranging icons in an online portal for an online apparel ordering. For example, modify or rearrange the order of contents in a drop-down menu used for short listing the product or the service. In another embodiment, the order of the attribute values is utilized to generate a customer decision tree, a graphical representation of order of attribute values in the form of one or more nodes and one or more sub nodes. In one embodiment, the user intention is derived for a category from one source is compared with another source to determine one or more key differentiators across sources such as an online mode and an offline mode, etc., and readjusts one or more practical strategies. In another embodiment, changing trend of the user intention is arrived by deriving user intention at different point in time continuously and comparing the intentions to arrive consistency of the user intentions to apply for the one or more practical strategies.

In a second exemplary embodiment, the user intention reflected by the magnitude of attribute values for choosing a product or a service of a at least one business. The outcomes of the principal component analysis particularly the magnitude of factor loadings of the significant attribute values of the significant latent variable enable to identify the intention proportion given to the product characteristics given by the one or more users during choosing the product or the service and to name the latent variable. A proportion of customer intention while choosing the product or the service is indicated. The outcomes provided by the user intention derivation engine 304 such as at least one attribute value having a positive intention and at least one attribute value having a negative intentions are passed into an entity solution engine 306 through one or more interfaces. In an embodiment, intention-service comparison is performed by comparing an intention proportion against an attribute values proportion of the existing service to enable identification of at least one gap in an existing business. For example, the user intention derivation engine 304 is interconnected with an online assortment module 308A that enables to modify the list and number of products to be displayed in the online portal based on the user intention. For example, the user intention derivation engine 304 generates a first latent variable having factor loadings of 0.90, 0.80, 0.70 . . . etc. for an attribute value 1, an attribute value 2, an attribute value 3 respectively which indicates the user is in need of the attribute value 2 at 89% (0.80/0.90) in comparison to the attribute value 1 and in same way the user is in need of the attribute value 3 at 78% (0.70/0.90) in comparison to the attribute value 1.

In an embodiment, a comparison between (a) the proportion of attribute values intended by the users, and (b) proportion of attribute values is offered in the online assortment is made for the one or more practical strategies. For example, the online assortment for an apparel category, the attribute value 2 is displayed 60% in comparison to the attribute value 1 and lost sales is calculated as (89−60) which is equal to 29% and which is due to lack of the attribute value 2 displayed in the online assortment. Similarly, the attribute value 3 displayed in 85% and overstock is calculated as (85−78=7), 7% and necessary adjustment is made in the online assortment. Accordingly, existing gap in the online assortment is identified using a planogram information alone and without requiring historical sales data. Therefore, this approach may be implemented for one business which started recently or with no transactional sales data in brick-and-mortar stores or with no event data such as a cart information in online ordering or absence of similar information of other business.

In one embodiment, the user intention derivation engine 304 is interconnected with the manufacturing process module 308B that decides manufacturing of apparels for a current season. For example, in women's formal dress manufacturing, white color is avoided with a polka dot pattern as the white color having a negative factor loading in a latent variable in which the polka dot pattern has highest positive factor loading. The white color and the poke dot pattern have opposite intentions and combination of the attribute values having opposite magnitude of factor loadings are avoided during manufacturing of an apparel. In contrast, the attribute values or services having positive loadings within a latent variable indicate synergistic intentions and may be used various ways in various practical requirements. The user intention derivation engines 304 thus identifies attributes to be added or deleted in single or in combinations for the brick-and-mortar stores and e-commerce retailing. In another embodiment, the user intention derivation engine 304 is interconnected with a point of sales system that enables to validate sales behavior as compared to intention behavior and to identify gap in existing business.

In a third exemplary embodiment, the user intention is reflected by a hidden significant association and a disassociation of group of attribute values intended by the one or more users. The outcomes of the principal component analysis particularly the group of attribute values of a significant latent variable which deviates from another group of attribute values present in another significant latent variable enable to determine the association and the disassociation of group of attribute values intended by the one or more users during choosing a product or service. The principal component analysis validates a selection of group of attribute values by the user is due to random or cause and the selection which are due to cause or purpose or intended behavior are indicated from significance and the attribute values that are selected due to random or unintended purpose are indicated by non-significance of the principal component analysis. The determined hidden significant association and disassociation of group of attribute values intended by the users during choosing a product or service may be applied for the practical strategies. For example, at least one at (a) women's formal dress, (b) the outcomes received from the user intention derivation engine 304 which is interconnected with the manufacturing process module 308B, and (c) the determined association among a black color, a polka dot pattern, and a brand 'A' which is noted as first group indicated from the significant latent variable, are considered as key input for the manufacturing process. Alternatively, the combination of the polka dot pattern along with the black color in brand 'A' is intended by the one or more users and the polka dot pattern with other color is not intended by the one or more users or other combinations involving the polka dot pattern may not be intended by the one or more users. Similarly, the determined association among '$200 above' price. 'floral' pattern, and '8P' petite size is noted as a second group indicated by another significant latent variable and act as a key input for the manufacturing process. Therefore, the first group is deviating from the second group indicating that one or more users intended to have either the first group or the second group but unintended to have combined of both the first group and the second group.

In a fourth exemplary embodiment, the user intention is reflected by an unintended attribute values for choosing a product or service of a business. The outcomes of the principal component analysis particularly the non-significant attribute values of the one or more latent variables enable to identify the unimportant attribute values for the one or more users among the large number of attribute values provided as at least one option for the one or more users in the online portal or the kiosk. The principal component analysis validates selection of attribute values by the user is due to random or cause and those attribute values that are selected due to random or unintended purpose are indicated by non-significance of principal component analysis. The identified unimportant attribute values of at least one user intention may be applied for one or more practical needs. In one embodiment, the unimportant attribute values or services may be dropped from the list of options provided for selection of products or services. In another embodiment, may be used to remove unimportant attribute values from the drop-down menu used for short listing a product or service.

The variable reduction is performed using weighted information of one or more business combined or group of business and enables to derive user unified intention associated with one or more businesses or group of businesses. The user unified intention is derived in two methods such as (a) from the significance of attribute values in a significant latent variable, and (b) from group of attribute values that exist in one latent variable which differ from another group of attribute values that exist in another latent variable.

In a first exemplary embodiment, the user unified intention is reflected by an intended attribute values for choosing a product or service across one or more business. The outcomes of the principal component analysis, particularly the significant attribute values of one or more significant latent variables, enable to identify the important attribute values for the users among large number of attribute values provided as at least one option for the one or more users in the online portal or the kiosk across one or more business. A principal component analysis validates whether the selection of group of attribute values across business by the user is due to random or cause and the selection which are due to cause or purpose or intended behavior are indicated from significance and the attribute values that are selected due to random or unintended purpose are indicated by non-significance of principal component analysis. In an embodiment, attribute value may be a product character or service etc. For example, identified important attribute values or service are brand of a t shirt, brand of a car, color of a car, variant of a car, type of hotel booked, type of food ordered, type of rental car opted, number of pets, etc.

In a second exemplary embodiment, the user unified intention reflected by an association and a disassociation of group of attribute values intended by the one or more users. The outcomes of the principal component analysis particularly the group of attribute values of a significant latent variable which deviates from another group of attribute values present in another significant latent variable enable to detect the association and the disassociation of the group of attribute values intended by the one or more users during choosing a product or service across one or more businesses. A principal component analysis validates whether the selection of group of attribute values across business by the user is due to random or cause and the selection which are due to cause or purpose or intended behavior are indicated from significance and the attribute values that are selected due to random or unintended purpose are indicated by non-significance of principal component analysis. For example, the determined association among buying high end car, extra-large size dress, to stay in five-star hotel, to wear luxury watches noted as first group which is indicated from a significant latent variable and act as key input for one or more practical strategies. Similarly, the detected association among preferring to buy a sports jeep/car, wearing sports shoes, staying in cottages, wearing top brand casuals noted as second group and act as key input for one or more practical strategies.

The detected association among preferring to buy a low-end car, to stay in economy hotel, to buy promoted items, etc is noted as third group which is indicated from another significant latent variable. The first group, the second group and the third group are deviating with each other indicating that one or more users intended to have either the first group or the second group or the third group but unintended to have combination of one or more groups or having less chance of overlapping across groups. For example, one group of activities is differing from another group of activities and all the activities within a group are highly associated with each other and termed as 'unified intention' for a group. The unified intention indicates how performance of one activity is reflected from a performance of other activity. For example, activity of intended to buy a high-end car is an indicator of his/her intention of staying in a five-star hotel or intention of wearing luxury watches and that may be termed as synergistic intention. In another example, promotion is performed based on a synergistic intention that exist between attribute values or services of one or more business.

The entity solution engine 308 receives at least one user intention as an input from the user intention derivation engine 304 and the processed information from the data processing module 302 through one or more interfaces. The latent variables and event associated to one or more segments of at least one of: (a) the one or more users, (b) the one or more stores, and (c) one or more locations, is received from the user intention derivation engine 304 and the data processing module 302 based on the one or more practical strategies to be derived. In an embodiment, the event denotes outcome of searching of an intended product or service by the at least one user through kiosk, e-commerce portal, a mobile application, or similar applications.

The event corresponds to outcome of searching of an intended product or service by the user and received from the data processing module 302. In one embodiment, products which are purchased or not purchased by the one or more users, time spent for shortlisting the product, and number of clicks made during the session are processed to represent as the event by suitable binary coding or numeric values. For example, a user may try to shortlist an apparel under 'women's top' category having many filters or options using a kiosk, by clicking few filters, and if she had bought an apparel noted as '1' in binary coding or if she had left without buying is noted as '0' in binary coding. In another embodiment, a service opted or not opted by the one or more users are processed using binary coding to represent event. For example, he/she may try to shortlist a health spa service having many filters using the online portal by selecting options a, b, c, and if he/she opted a service noted as '1' or if she had left without opting is noted as '0'. By this way event is noted as '1' or '0' depending on outcomes of user session. In another embodiment, time spent for shortlisting a service, number of clicks made during the session, and number of likes made during the session are processed to represent an event by numeric values. The time duration of information associated to derivation of the latent variable and event are decided based on one or more trends associated with business. In one embodiment, duration of information to derive the latent variable and the event is decided as recent six months for fashion apparels, last one year for mobile categories, last two years for car rental service and last five years for hotel booking.

In analytical term, the structural equation model is a specification of a relationship between X and Y, where either the X or the Y or both are latent variables. In one embodiment, the structural equation model is developed by regressing 'event' against the latent variables of existing category or business or the user and noted as a structural equation model_event. In one embodiment, significance of latent variables is used for one or more practical strategies. The attribute values or the services associated with the latent variable having negative magnitude of coefficients indicates lost sales opportunity and are increased in existing business or the stores or the category to indicate that the one or more users are unable to find at least one product or service of their intention. The attribute values or services associated with the latent variable having positive magnitude of coefficients are kept or continued in existing business or stores or category to indicate that the one or more users can find at least one product or service of their intention. The attribute values or services associated with latent variable having no significance of coefficients are removed or discontinued to indicate that the one or more users have no intention to buy products having those attribute values or the user have no intention to select services having those attribute values.

The user intention derivation engine 304 provides significant latent variables of one business or group of businesses. A latent variable of one business carries intention of the one or more users and a latent variable of the group of business carries unified intention which denotes the integrated intention that is the result of intention associated with the group of businesses. In one embodiment, the unified intention indicates how performance of one activity is reflected from a performance of other activity. For example, an activity of intended to buy a high-end car by an user may be an indicator of staying in five star hotel or intention of wearing luxury watches by the same user. In an exemplary embodiment, the structural equation model is developed by regressing latent variable of new category or business or user against latent variables of existing category or business or user and noted as structural equation model_latent. Latent variable for new category or business or user is predicted by applying latent variables of existing category or business or user in structural equation model_latent. In one embodiment, the one or more practical strategies for new category or business or user with no transactional history and existing category or business or user, are recommended based on the predicted latent variable for the new category or business or user from structural equation model_latent.

The attribute values associated with the predicted latent variable are recommended to keep in new store or new business or new category and the order of importance of attribute value is in proportion to magnitude of significant factor loadings of the attribute values. For example, one group of organization may have many businesses and each business may have the online portal or the kiosks. Latent variable derived from filter information of one business named Watches' is regressed against the latent variables derived from filter information of other business such as car selling or car renting, hotel booking, mobile sales and similar business and structural equation model_latent is developed. Assuming that when a new business namely 'watches' is opened in a location, latent variables derived from filter information of other business such as car purchase, hotel booking, mobile purchase and similar business of the same location is passed into the structural equation model_latent to predict latent variables. The predicted latent variable provides the potential watches to be kept in the new category 'watches'.

In another embodiment, the attribute values associated with the predicted latent variable are applied to enable default filters in a real time and a targeted promotion in a real time for the one or more users with no profile information. For example, when a user login an e-commerce portal and select 'watches' category, potential filters are enabled as default filter under watch category. The filter information of other business such as car purchase, hotel booking and mobile purchase of the same user with no profile is passed into the structural equation model_latent in real time and characteristics or attribute values associated with the predicted latent variable indicates the potential filters to be used as default filter under watch category. Characteristics or attribute values associated with the predicted latent variable are used to decide type of watches to be promoted during personalized promotion across channels such as email campaign, etc, to the same user.

Figure 4A:
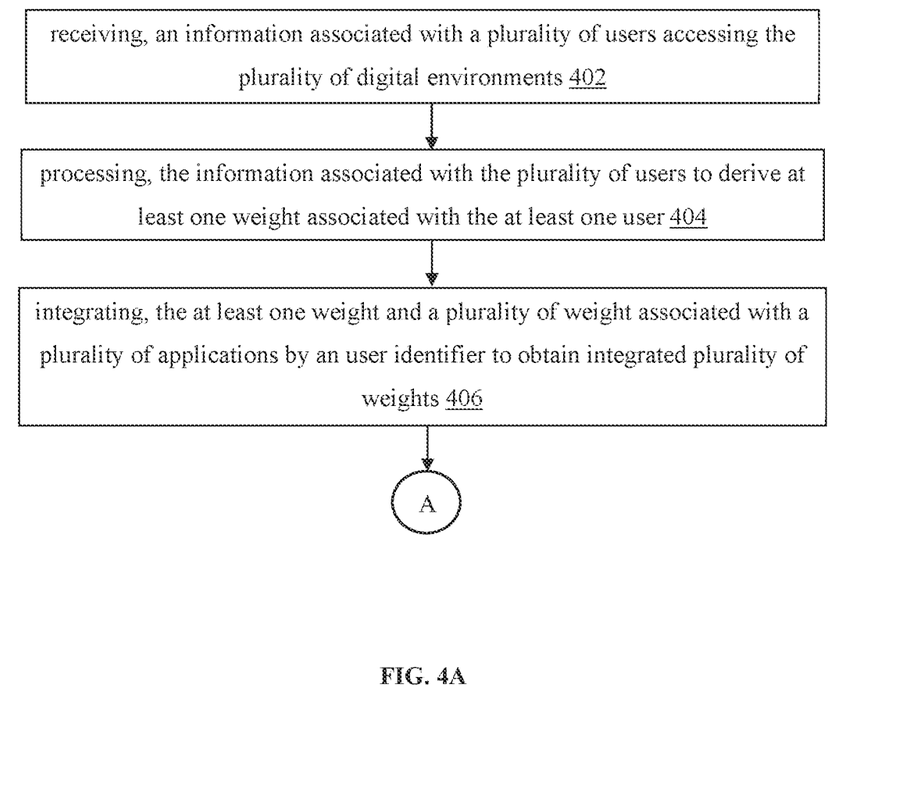
FIGS. 4A and 4B are exemplary flow diagrams illustrating method of determining the unified user intention from the plurality of digital environment for the plurality of strategies, according to some embodiments of the present disclosure.

FIGS. 4A and 48 are exemplary flow diagrams illustrating method of determining the unified user intention from the plurality of digital environments for the plurality of strategies, according to some embodiments of the present disclosure. In an embodiment, the user intention derivation system 200 comprises one or more data storage devices or the memory 204 operatively coupled to the one or more hardware processors 202 and is configured to store instructions for execution of steps of the method by the one or more processors 202. The flow diagram depicted is better understood by way of following explanation/description. The steps of the method of the present disclosure will now be explained with reference to the components of the system as depicted in FIGS. 2 and 3.

Figure 4B:
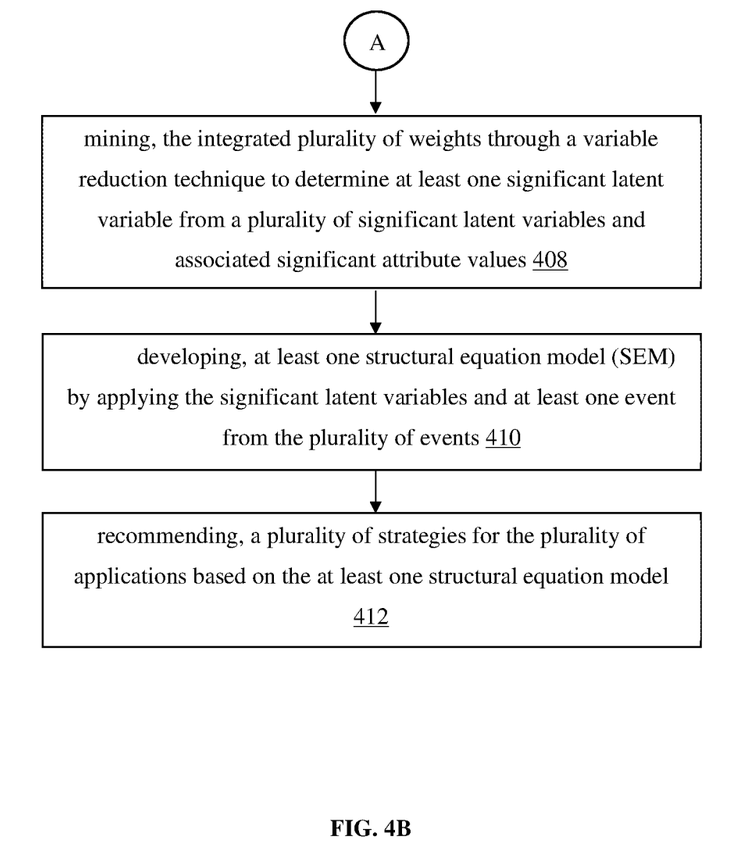

At step 402, an information associated with a plurality of users accessing the plurality of digital environments are received. The information associated with the plurality of users accessing the plurality of digital environments corresponds to at least one of: (a) order of a filter, (b) a plurality of click patterns, (c) a plurality of events, and (d) combination thereof. The plurality of applications corresponds to at least one of (a) a product, (b) a service, and (c) a category. The plurality of events corresponds to at least one of: (a) time spent by the at least one user while accessing the plurality of digital environments for an intended product, (b) number of click patterns by the at least one user, (c) the intended product purchased by the at least one user, and (d) combination thereof. At step 404, the information associated with the plurality of users is processed to derive at least one weight associated with the at least one user. The at least one weight is derived while the plurality of users accessing the plurality of digital environments based on at least one of: (a) the number of click patterns, and (b) the order of click or filter. At step 406, the at least one weight is integrated with a plurality of weight associated with a plurality of applications by an user identifier to obtain integrated plurality of weights. At step 408, the integrated plurality of weights is extracted through a variable reduction technique to determine at least one significant latent variable from a plurality of significant latent variables and associated significant attribute values. At step 410, at least one structural equation model (SEM) is developed by applying the significant latent variables and at least one event from the plurality of events. At step 412, a plurality of strategies is recommended for the plurality of applications based on the at least one structural equation model. The plurality of strategies corresponds to at least one of: (a) a customized promotion, (b) an assortment, (c) a manufacturing process, and (d) an advertisement.

The significance of the latent variable is identified from at least one eigen value. The significance of attribute value is identified from a significant factor loadings under each significant latent variable. A user's intention proportion of attribute values is predicted for the plurality of strategies in a real time. An event is regressed against at least one latent variable of the plurality of applications to form a structural equation model_event to identify a significance of a latent variable. The significant latent variables are named based on a significance and a magnitude of attribute values within a latent variable and to identify synergistic intentions of the plurality of users associated with the attribute values. At least one latent variable of a new category or a product are regressed against the latent variable of an existing category or a product to form a structural equation model_latent for recommending the plurality of strategies in a real time which is independent of a transactional history and a profile information. The plurality of strategies through intention service comparison is performed by comparing a proportion of intention against a proportion of attribute values of the existing service for identifying at least one gap in the existing services and to take the plurality of strategies in the absence of the transactional history. The plurality of strategies are recommended based on at least one of: (a) predicted latent variable for the plurality of applications from the structural equation model_latent, (b) inferring significance of latent variables for the plurality of applications from the structural equation model_event, and (c) an intention service comparison.

Traditionally, the practical strategies are based on analytical outcomes derived from historical transactions. If a product or service intended by a user is not available in the application, which was not captured in the transactional data. This indicates one of the limitations of usage of the transactional data for practical strategies. In other word, the historical transactional data does not capture lost sales opportunities or lost service opportunities. The embodiments of present disclosure herein overcome this limitation by providing a solution to determine unified user intention from a plurality of digital environment for plurality of strategies. The embodiments of the present disclosure enable to take practical strategies based on customer intention derived from click or filter information of digital sources. The embodiments of the present disclosure further enable to form practical strategies for new business with no historical data. The existing gap in the online assortment is identified using a planogram information alone and without requiring historical sales data. Therefore, the present disclosure may be implemented for one business which started recently or with no transactional sales data in brick-and-mortar stores or with no event data such as cart information in online ordering or absence of similar information of other business. The embodiments of the present disclosure further indicate how a generated huge volume of information which carry signals of the customer intention based on a digital transformation could be explored for practical applications.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and the include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for determining a unified user intention from a plurality of digital environments for a plurality of strategies, comprising:
   receiving, via one or more hardware processors, information associated with a plurality of users accessing the plurality of digital environments, wherein
      the information associated with the plurality of users accessing the plurality of digital environments comprises a plurality of events and at least one of: (a) an order of a filter, (b) a plurality of click patterns, and (c) combination thereof,
      the plurality of events corresponds to:
         (a) a time duration spent by at least one user of the plurality of users while accessing the plurality of digital environments for an intended product,
         (b) a number of click patterns of the plurality of click patterns by the at least one user, and
         (c) the intended product purchased by the at least one user of the plurality of users, and
      the time duration is based on a trend associated with at least one application of a plurality of applications of the plurality of digital environments;
   identifying, based on the received information, each of the plurality of users based on a facial recognition and a thumb impression of each of the plurality of users, wherein the unified user intention indicates an integrated intention that is a result of at least one intention associated with one or more businesses associated with the plurality of digital environments;
   processing, based on the identification, via the one or more hardware processors, the information associated with the plurality of users;
   deriving, based on the processing, at least one weight associated with the at least one user of the plurality of users, wherein
      the at least one weight is derived while the plurality of users accessing the plurality of digital environments, and
      the at least one weight is derived based on:
         (a) the number of click patterns by the at least one user, and
         (b) an order of click or filter by the at least one user;
   integrating, via the one or more hardware processors, the at least one weight and a plurality of weights associated with the plurality of applications of the plurality of digital environments by a user identifier to obtain an integrated plurality of weights, wherein the integration is based on the number of click patterns and the order of the click or the filter by the plurality of users during finding of the intended product or the service through the plurality of digital environments;
   mining, via the one or more hardware processors, the integrated plurality of weights through a variable reduction technique;
   determining, via the one or more hardware processors, based on the mining, via the one or more hardware processors, at least one significant latent variable from a plurality of significant latent variables and associated significant attribute values;
   developing, via the one or more hardware processors, at least one structural equation model (SEM) by applying the significant latent variables and at least one event of the plurality of events;
   deriving, via the one or more hardware processors, the unified user intention based on:
      (a) an order of attribute values in the significant latent variables,
      (b) a magnitude of factor loadings of the attribute values in significant factor loadings,
      (c) first group of attribute values that exist in first latent variable of the plurality of significant latent variables which differ from second group of attribute values that exist in second latent variable of the plurality of significant latent variables, and
      (d) non-significant attribute values;
   recommending, via the one or more hardware processors, a plurality of strategies for the plurality of applications based on the at least one structural equation model and the derived unified user intention, wherein the plurality of strategies corresponds to (a) a customized promotion, (b) an assortment, (c) a manufacturing process, and (d) an advertisement;
   determining, via the one or more hardware processors, an order importance of a plurality of icons of the plurality of digital environments during display of the product or service based on recommended plurality of strategies and the derived user unified intention; and automatically rearranging, via the one or more hardware processors, based on the determined order, the plurality of icons of each of the plurality of digital environments, wherein
the plurality of icons is rearranged to shortlist the product or the service,
the plurality of icons is rearranged with respect to changing trend of the derived user unified intention, and
the plurality of icons is rearranged at different point in time continuously and in consistent with the derived user unified intention.

2. The processor implemented method as claimed in claim 1, wherein the plurality of applications is related to at least one of: (a) a product, (b) a service, and (c) a category.

3. The processor implemented method as claimed in claim 1, wherein
a significance of a latent variable of the plurality of significant latent variables is identified from at least one eigen value,
a significance of attribute value is identified from the significant factor loadings under each significant latent variable of the plurality of significant latent variables, and
a user intention proportion of attribute values is predicted for the plurality of strategies in a real time.

4. The processor implemented method as claimed in claim 1, further comprising regressing an event of the plurality of events against at least one latent variable to form a structural equation model_event to identify a significance of a latent variable.

5. The processor implemented method as claimed in claim 1, wherein the significant latent variables are named based on attribute values within a latent variable.

6. The processor implemented method as claimed in claim 1, wherein at least one latent variable of a new category or a product are regressed against the latent variable of an existing category or a product to form a structural equation model_latent for recommending the plurality of strategies in a real time.

7. The processor implemented method as claimed in claim 6, wherein the plurality of strategies through intention service comparison is performed by comparing a proportion of intention against a proportion of attribute values of an existing service for identifying at least one gap in the existing service.

8. The processor implemented method as claimed in claim 1, wherein the plurality of strategies is recommended based on at least one of: (a) predicted latent variable for the plurality of applications from a structural equation model_latent, (b) inferring significance of latent variables for the plurality of applications from a structural equation model_event, and (c) an intention service comparison.

9. A user intention derivation system to determine a unified user intention from a plurality of digital environments for a plurality of strategies, comprising:
a memory storing instructions;
one or more communication interfaces; and
one or more hardware processors coupled to the memory via the one or more communication interfaces, wherein the one or more hardware processors are configured by the instructions to:
receive information associated with a plurality of users accessing the plurality of digital environments, wherein
the information associated with the plurality of users accessing the plurality of digital environments comprises a plurality of events and at least one of:
(a) an order of a filter, (b) a plurality of click patterns, and (c) combination thereof,
the plurality of events corresponds to:
(a) a time duration spent by at least one user of the plurality of users while accessing the plurality of digital environments for an intended product,
(b) a number of click patterns of the plurality of click patterns by the at least one user, and
(c) the intended product purchased by the at least one user of the plurality of users,
the time duration is based on a trend associated with at least one application of the plurality of digital environments;
identify, based on the received information, each of the plurality of users based on a facial recognition and a thumb impression of each of the plurality of users, wherein the unified user intention indicates an integrated intention that is a result of at least one intention associated with one or more businesses associated with the plurality of digital environments;
process, based on the identification, the information associated with the plurality of users;
derive, based on the processing, at least one weight associated with the at least one user of the plurality of users, wherein
the at least one weight is derived while the plurality of users accessing the plurality of digital environments, and
the at least one weight is derived based on:
(a) the number of click patterns by the at least one user, and
(b) an order of click or filter by the at least one user;
integrate the at least one weight and a plurality of weights associated with the plurality of applications of the plurality of digital environments by a user identifier to obtain an integrated plurality of weights, wherein the integration is based on the number of click patterns and the order of the click or the filter by the plurality of users during finding of the intended product or the service through the plurality of digital environments;
mine, the integrated plurality of weights through a variable reduction technique;
determine at least one significant latent variable from a plurality of significant latent variables and associated significant attribute values;
develop, at least one structural equation model (SEM) by applying the significant latent variables and at least one event of the plurality of events; and
derive the user unified intention based on:
(a) an order of attribute values in the significant latent variables,
(b) a magnitude of factor loadings of the attribute values in significant factor loadings,
(c) first group of attribute values that exist in first latent variable of the plurality of significant latent variables which differ from second group of attribute values that exist in second latent variable of the plurality of significant latent variables, and
(d) non-significant attribute values;
recommend, a plurality of strategies for the plurality of applications based on the at least one structural equation model and the derived user unified intention, wherein the plurality of strategies corresponds to (a) a customized promotion, (b) an assortment, (c) a manufacturing process, and (d) an advertisement;
determine an order importance of a plurality of icons of the plurality of digital environments during display of the product or service based on recommended plurality of strategies and the derived user unified intention; and
automatically rearrange, based on the determined order, the plurality of icons of each of the plurality of digital environments, wherein
the plurality of icons is rearranged to shortlist the product or the service,
the plurality of icons is rearranged with respect to changing trend of the derived user unified intention, and
the plurality of icons is rearranged at different point in time continuously and in consistent with the derived user unified intention.

10. The user intention derivation system as claimed in claim 9, wherein the plurality of applications is related to at least one of: (a) a product, (b) a service, and (c) a category.

11. The user intention derivation system as claimed in claim 9, wherein
a significance of a latent variable of the plurality of significant latent variables is identified from at least one eigen value,
a significance of attribute value is identified from the significant factor loadings under each significant latent variable of the plurality of significant latent variables, and
a user's intention proportion of attribute values is predicted for the plurality of strategies in a real time.

12. The user intention derivation system as claimed in claim 9, wherein the one or more hardware processors are configured by the instructions to regressing an event of the plurality of events against at least one latent variable to form a structural equation model_event to identify a significance of a latent variable.

13. The user intention derivation system as claimed in claim 9, wherein the significant latent variables are named based on attribute values within a latent variable.

14. The user intention derivation system as claimed in claim 9, wherein at least latent variable of a new category or a product are regressed against the latent variable of an existing category or a product to form a structural equation model_latent for recommending the plurality of strategies in a real time.

15. The user intention derivation system as claimed in claim 14, wherein the plurality of strategies through intention service comparison is performed by comparing a proportion of intention against a proportion of attribute values of an existing service for identifying at least one gap in the existing service.

16. The user intention derivation system as claimed in claim 9, wherein the plurality of strategies is recommended based on at least one of: (a) predicted latent variable for the plurality of applications from a structural equation model_latent, (b) inferring the significance of the latent variables for the plurality of applications from an structural equation model_event, and (c) the intention service comparison.

17. One or more non-transitory machine-readable information storage mediums comprising one or more instructions which when executed by one or more hardware processors perform actions comprising:
receiving information associated with a plurality of users accessing the plurality of digital environments, wherein the information associated with the plurality of users accessing the plurality of digital environments comprises a plurality of events and at least one of: (a) an order of a filter, (b) a plurality of click patterns, and (c) combination thereof,
the plurality of events corresponds to:
(a) a time duration spent by at least one user of the plurality of users while accessing the plurality of digital environments for an intended product,
(b) a number of click patterns of the plurality of click patterns by the at least one user, and
(c) the intended product purchased by the at least one user of the plurality of users, and
the time duration is based on a trend associated with at least one application of a plurality of applications of the plurality of digital environments;
identifying, based on the received information, each of the plurality of users based on a facial recognition and a thumb impression of each of the plurality of users, wherein the unified user intention indicates an integrated intention that is a result of at least one intention associated with one or more businesses associated with the plurality of digital environments;
processing, based on the identification, the information associated with the plurality of users;
deriving, based on the processing, at least one weight associated with the at least one user of the plurality of users, wherein
the at least one weight is derived while the plurality of users accessing the plurality of digital environments, and
the at least one weight is derived based on:
(a) the number of click patterns by the at least one user, and
(b) an order of click or filter by the at least one user;
integrating the at least one weight and a plurality of weights associated with the plurality of applications of the plurality of digital environments by a user identifier to obtain an integrated plurality of weights, wherein the integration is based on the number of click patterns and the order of the click or the filter by the plurality of users during finding of the intended product or the service through the plurality of digital environments;
mining the integrated plurality of weights through a variable reduction technique;
determining, based on the mining, at least one significant latent variable from a plurality of significant latent variables and associated significant attribute values;
developing at least one structural equation model (SEM) by applying the significant latent variables and at least one event of the plurality of events;
deriving, via the one or more hardware processors, the unified user intention based on:
(a) an order of attribute values in the significant latent variables,
(b) a magnitude of factor loadings of the attribute values in significant factor loadings,
(c) first group of attribute values that exist in first latent variable of the plurality of significant latent variables which differ from second group of attribute values that exist in second latent variable of the plurality of significant latent variables, and
(d) non-significant attribute values;
recommending, a plurality of strategies for the plurality of applications based on the at least one structural equation model and the derived unified user intention, wherein the plurality of strategies corresponds to (a) a customized promotion, (b) an assortment, (c) a manufacturing process, and (d) an advertisement;

determining, via the one or more hardware processors, an order importance of a plurality of icons of the plurality of digital environments during display of the product or service based on recommended plurality of strategies and the derived user unified intention; and automatically rearranging, via the one or more hardware processors, based on the determined order, the plurality of icons of each of the plurality of digital environments, wherein the plurality of icons is rearranged to shortlist the product or the service, the plurality of icons is rearranged with respect to changing trend of the derived user unified intention, and the plurality of icons is rearranged at different point in time continuously and in consistent with the derived user unified intention.

\* \* \* \* \*